(12) United States Patent
Amerasinghe et al.

(10) Patent No.: US 11,577,272 B2
(45) Date of Patent: Feb. 14, 2023

(54) MAGNETIC ASSEMBLIES, APPARATUSES AND PROCESSES FOR PRODUCING OPTICAL EFFECT LAYERS COMPRISING ORIENTED NON-SPHERICAL MAGNETIC OR MAGNETIZABLE PIGMENT PARTICLES

(71) Applicant: SICPA HOLDING SA, Prilly (CH)

(72) Inventors: Cédric Amerasinghe, Les Cullayes (CH); Mathieu Schmid, Lausanne (CH); Claude-Alain Despland, Prilly (CH)

(73) Assignee: SICPA HOLDING SA, Prilly (CH)

( * ) Notice: Subject to any disclaimer, the term of this patent is extended or adjusted under 35 U.S.C. 154(b) by 196 days.

(21) Appl. No.: 17/053,721

(22) PCT Filed: May 7, 2019

(86) PCT No.: PCT/EP2019/061678
§ 371 (c)(1),
(2) Date: Nov. 6, 2020

(87) PCT Pub. No.: WO2019/215148
PCT Pub. Date: Nov. 14, 2019

(65) Prior Publication Data
US 2021/0245197 A1    Aug. 12, 2021

(30) Foreign Application Priority Data
May 8, 2018   (EP) ..................................... 18171312

(51) Int. Cl.
*B05D 3/00*        (2006.01)
*B05D 3/06*        (2006.01)
(Continued)

(52) U.S. Cl.
CPC ............. *B05D 3/207* (2013.01); *B05D 3/067* (2013.01); *B05D 5/065* (2013.01); *H01F 7/0273* (2013.01); *B41M 3/148* (2013.01); *B42D 25/369* (2014.10)

(58) Field of Classification Search
CPC .......... B05D 3/207; B05D 3/067; B05D 3/00; B05D 3/06; B05D 5/065; H01F 7/0273;
(Continued)

(56) References Cited

U.S. PATENT DOCUMENTS 2,570,856 A    10/1951   Carlton et al.
3,676,273 A     7/1972   Graves
(Continued)

FOREIGN PATENT DOCUMENTS

CN    102529326    7/2012
CN    104442055    3/2015
(Continued)

OTHER PUBLICATIONS

Indian First Examination Report issued in counterpart Indian Application No. 202017052499 dated Mar. 11, 2021.
(Continued)

*Primary Examiner* — Justin V Lewis
(74) *Attorney, Agent, or Firm* — Muncy, Geissler, Olds & Lowe, P.C.

(57) ABSTRACT

The present invention relates to the field of magnetic assemblies, magnetic apparatuses and processes for producing optical effect layers (OEL) comprising magnetically oriented non-spherical magnetic or magnetizable pigment particles on a substrate and providing an impression of a crescent moon-shaped element moving or rotating upon tilting the optical effect layer (OEL). In particular, the present invention relates to magnetic assemblies, magnetic apparatuses and processes for producing said OELs as
(Continued)

anti-counterfeit means on security documents or security articles or for decorative purposes.

19 Claims, 9 Drawing Sheets

(51) Int. Cl.
*H01F 7/02* (2006.01)
*B41M 3/14* (2006.01)
*B05D 5/06* (2006.01)
*B42D 25/369* (2014.01)

(58) Field of Classification Search
CPC .......... H01F 7/02; B41M 3/148; B41M 3/14; B42D 25/369; C09D 11/101; C09D 11/037
USPC .......................... 283/67, 72, 82, 94, 98, 99
See application file for complete search history.

(56) References Cited

U.S. PATENT DOCUMENTS

| | | | |
|---|---|---|---|
| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A | 5/1997 | Kashiwagi et al. |
| 6,251,329 | B1* | 6/2001 | Sheridon ............. G02B 26/026 264/408 |
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 8,343,615 | B2 | 1/2013 | Raksha et al. |
| 2007/0172261 | A1 | 7/2007 | Raksha et al. |
| 2010/0040799 | A1 | 2/2010 | Raksha et al. |
| 2013/0084411 | A1 | 4/2013 | Raksha et al. |
| 2014/0077485 | A1 | 3/2014 | Raksha et al. |
| 2017/0336896 | A1* | 11/2017 | Paolini, Jr. ............. G06F 3/046 |
| 2018/0093518 | A1* | 4/2018 | Schmid ................. H01F 7/0273 |

FOREIGN PATENT DOCUMENTS

| | | |
|---|---|---|
| CN | 204566894 | 8/2015 |
| EP | 0 686 675 | 2/1998 |
| EP | 1 666 546 | 6/2006 |
| EP | 1 710 756 | 10/2006 |
| EP | 2 157 141 | 2/2010 |
| EP | 2 306 222 | 4/2011 |
| EP | 2 325 677 | 5/2011 |
| EP | 2 402 401 | 1/2012 |
| WO | 02/073250 | 9/2002 |
| WO | 03/000801 | 1/2003 |
| WO | 2005/002866 | 1/2005 |
| WO | 2006/063926 | 6/2006 |
| WO | 2007/131833 | 11/2007 |
| WO | 2008/046702 | 4/2008 |
| WO | 2008/139373 | 11/2008 |
| WO | 2011/092502 | 8/2011 |
| WO | 2013/167425 A1 | 11/2013 |
| WO | 2014/108303 | 7/2014 |
| WO | 2014/108404 | 7/2014 |
| WO | 2015/082344 | 6/2015 |
| WO | 2015/086257 | 6/2015 |

OTHER PUBLICATIONS

"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

"Chemistry & Technology of UV & EB Formulation for Coatings, Inks & Paints", vol. IV, Formulation, by C. Lowe, G. Webster, S. Kessel and I. McDonald, 1996 by John Wiley & Sons in association with SITA Technology Limited.

Handbook of Physics, Springer 2002, pp. 463-464.

Z.Q. Zhu et D. Howe, Halbach permanent magnet machines and applications: a review, IEE. Proc. Electric Power Appl., 2001, 148, p. 299-308.

European Office Action in counterpart European Application No. 18171312.4 dated Oct. 23, 2018.

International Search Report and Written Opinion issued with respect to application No. PCT/EP2019/061678.

* cited by examiner

Fig. 3
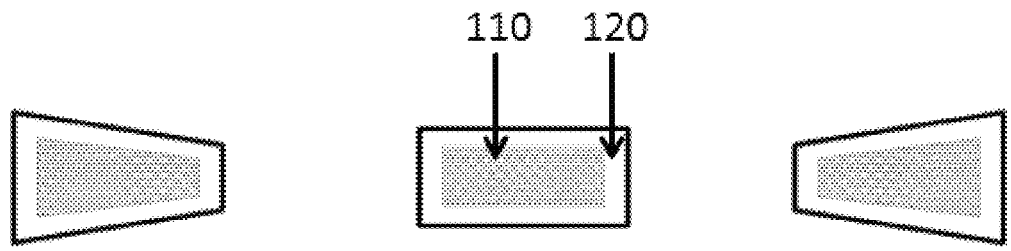
Fig. 3A
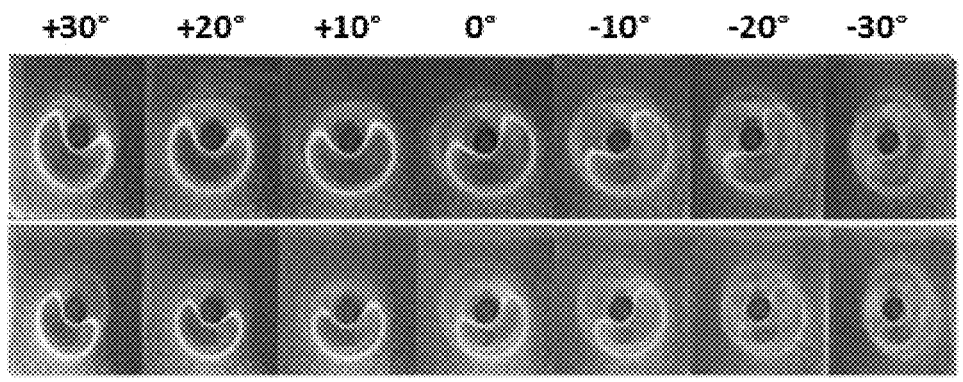
Fig. 3B
Fig. 3C
Fig. 3D
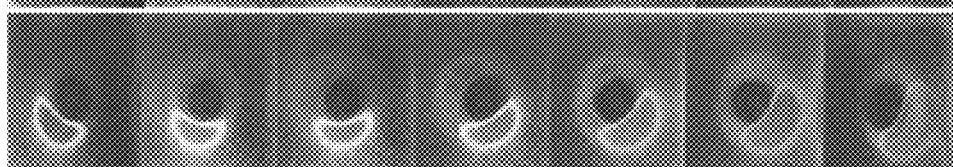
Fig. 3E
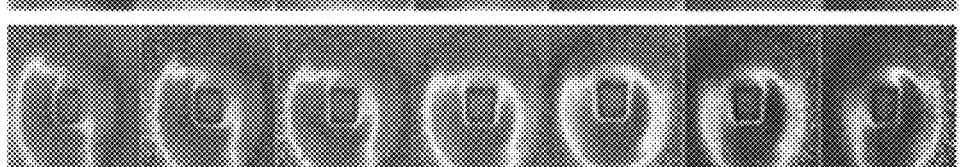

Fig. 8
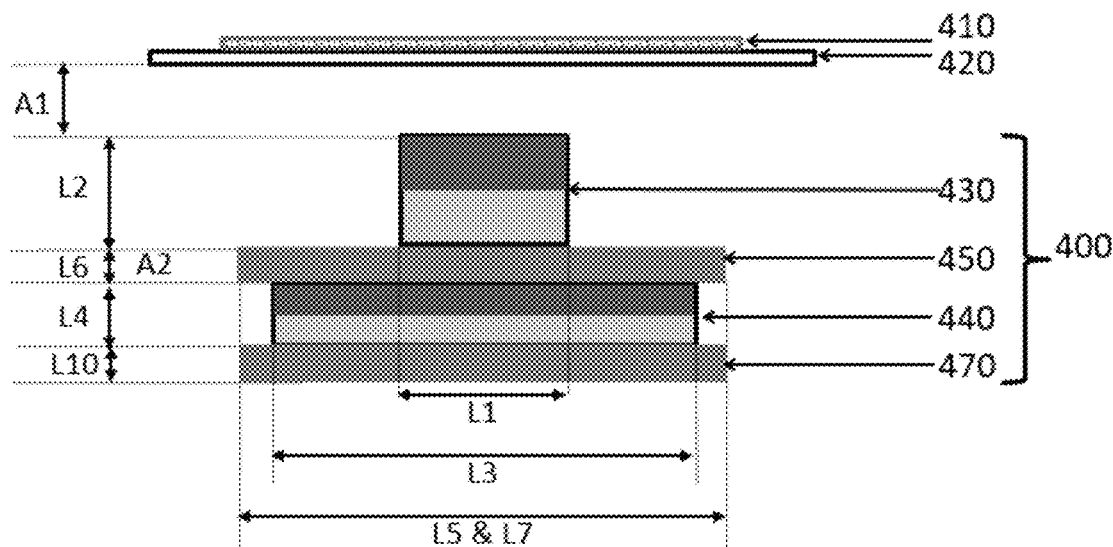
Fig. 9
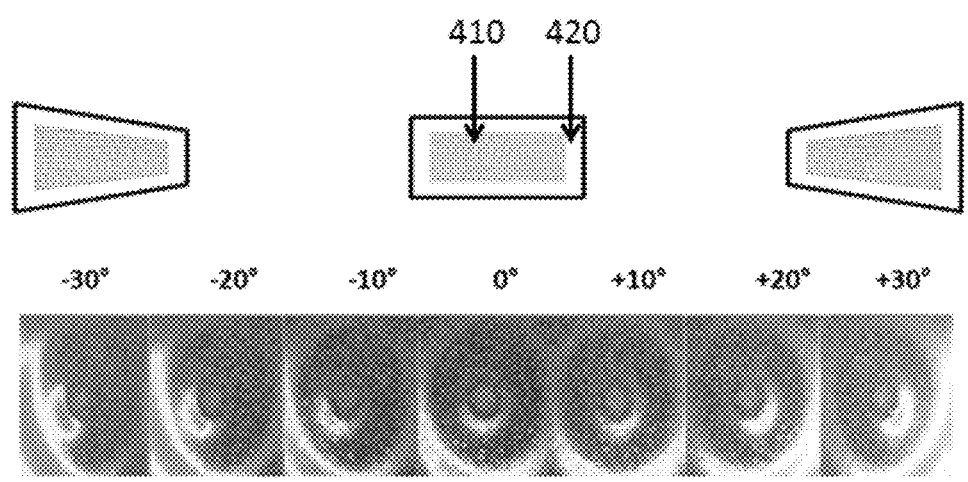
Fig. 9A

Fig. 10
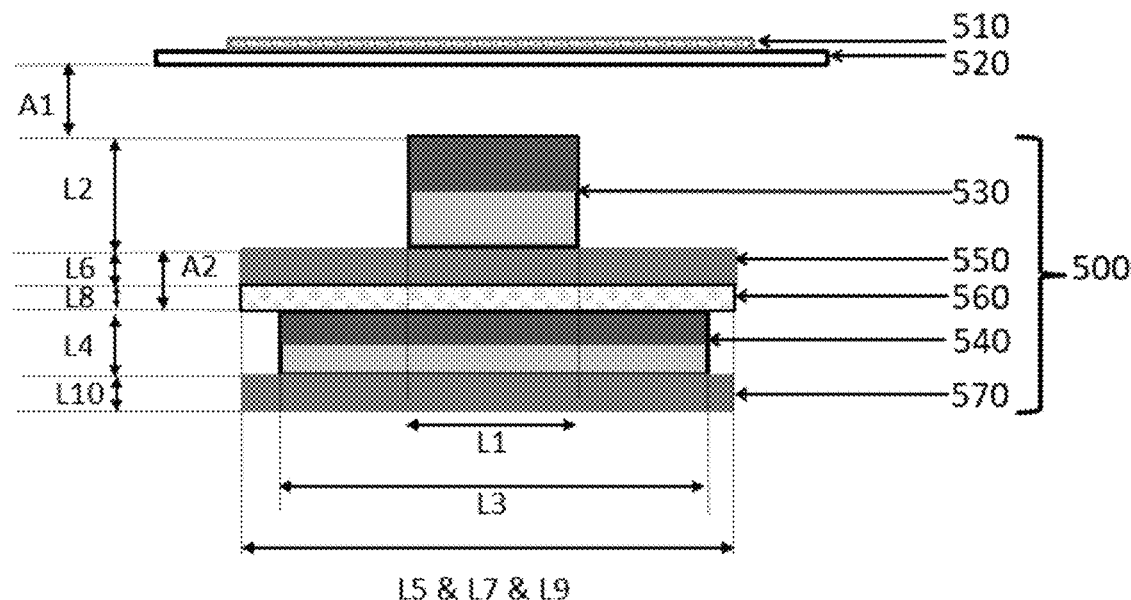
Fig. 11
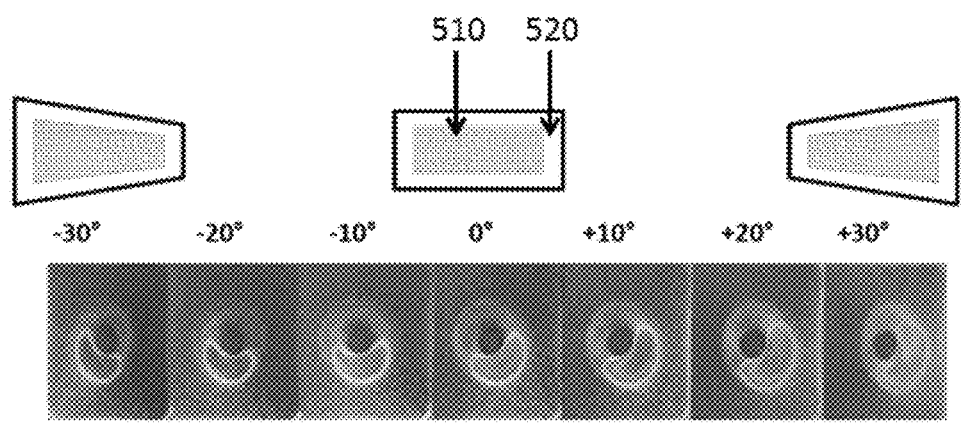
Fig. 11A

Fig. 12
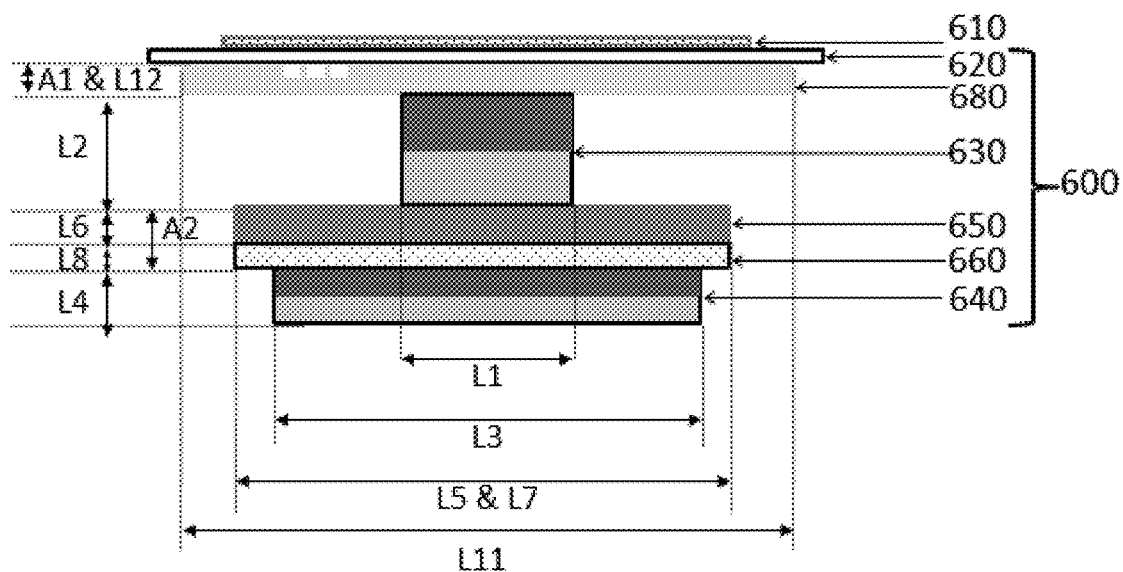
Fig. 13
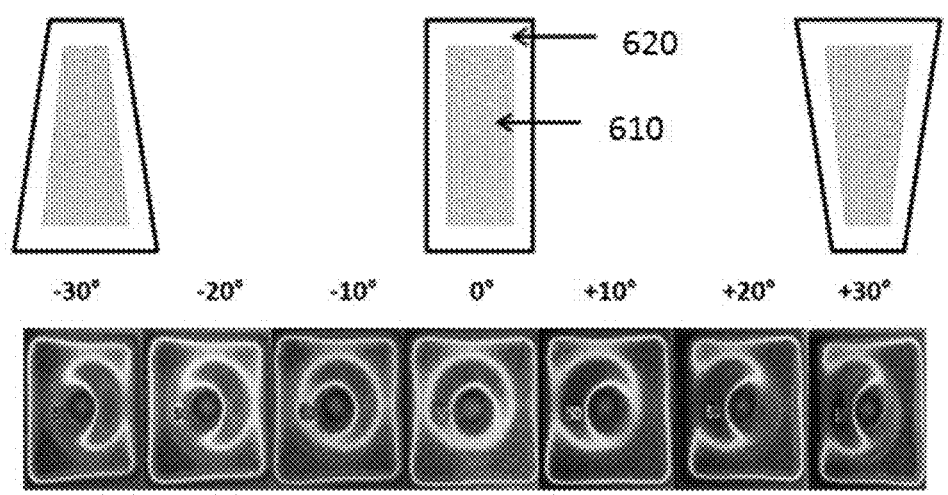
Fig. 13A

Fig. 16
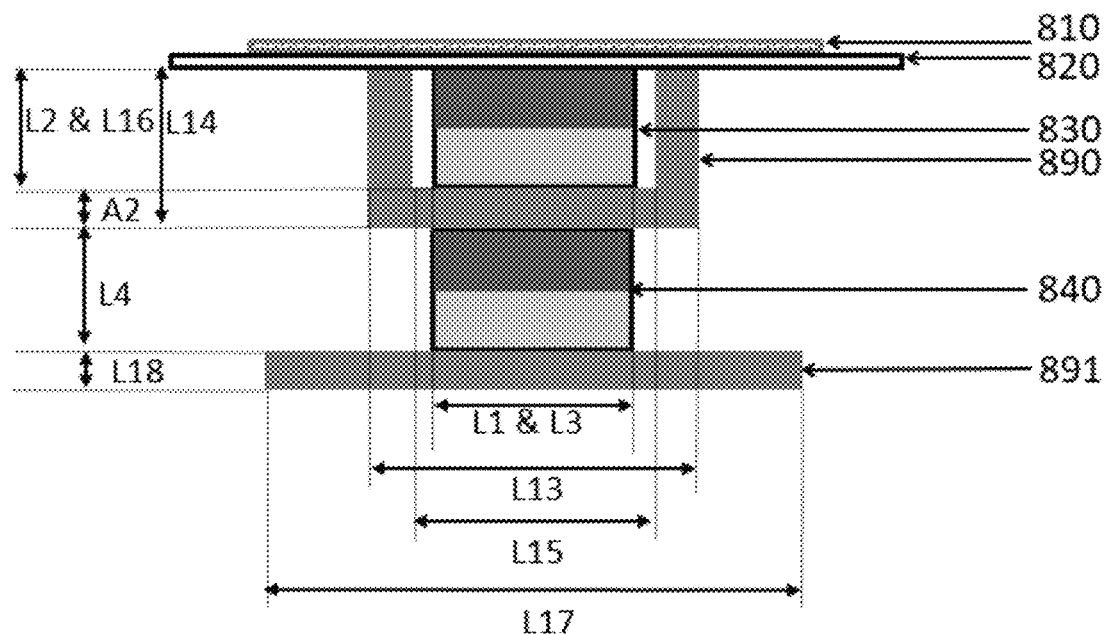
Fig. 17
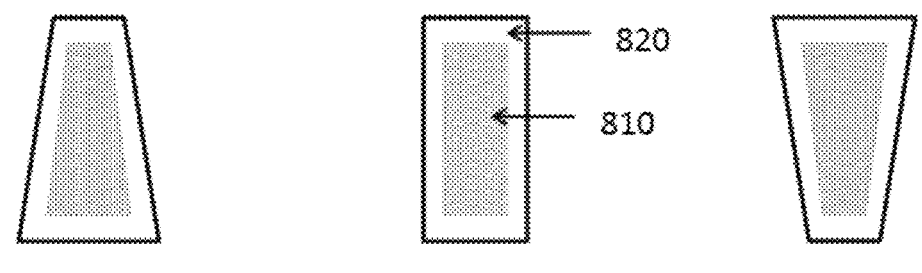
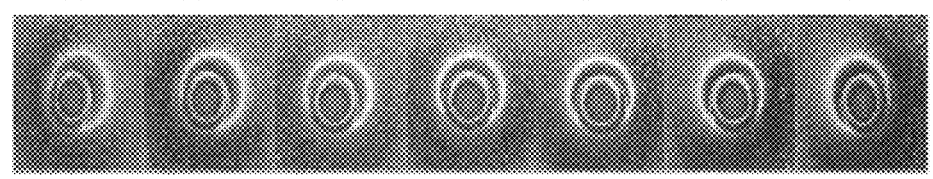
Fig. 17A

MAGNETIC ASSEMBLIES, APPARATUSES AND PROCESSES FOR PRODUCING OPTICAL EFFECT LAYERS COMPRISING ORIENTED NON-SPHERICAL MAGNETIC OR MAGNETIZABLE PIGMENT PARTICLES

FIELD OF THE INVENTION

The present invention relates to the field of the protection of value documents and value commercial goods against counterfeit and illegal reproduction. In particular, the present invention relates to optical effect layers (OELs) showing a viewing-angle dependent optical effect, magnetic assemblies and apparatuses and processes for producing said OELs, as well as uses of said OELs as anti-counterfeit means on documents.

BACKGROUND OF THE INVENTION

The use of inks, coating compositions, coatings, or layers, containing magnetic or magnetizable pigment particles, in particular non-spherical optically variable magnetic or magnetizable pigment particles, for the production of security elements and security documents is known in the art.

Security features, e.g. for security documents, can be classified into "covert" and "overt" security features. The protection provided by covert security features relies on the concept that such features are hidden, typically requiring specialized equipment and knowledge for their detection, whereas "overt" security features are easily detectable with the unaided human senses, e.g. such features may be visible and/or detectable via the tactile senses while still being difficult to produce and/or to copy. However, the effectiveness of overt security features depends to a great extent on their easy recognition as a security feature, because users will only then actually perform a security check based on such security feature if they are aware of its existence and nature.

Coatings or layers comprising oriented magnetic or magnetizable pigment particles are disclosed for example in U.S. Pat. Nos. 2,570,856; 3,676,273; 3,791,864; 5,630,877 and 5,364,689. Magnetic or magnetizable pigment particles in coatings allow for the production of magnetically induced images, designs and/or patterns through the application of a corresponding magnetic field, causing a local orientation of the magnetic or magnetizable pigment particles in the unhardened coating, followed by hardening the latter. This results in specific optical effects, i.e. fixed magnetically induced images, designs or patterns which are highly resistant to counterfeit. The security elements based on oriented magnetic or magnetizable pigments particles can only be produced by having access to both the magnetic or magnetizable pigment particles or a corresponding ink or composition comprising said particles, and the particular technology employed to apply said ink or composition and to orient said pigment particles in the applied ink or composition.

Moving-ring effects have been developed as efficient security elements. Moving-ring effects consist of optically illusive images of objects such as funnels, cones, bowls, circles, ellipses, and hemispheres that appear to move in any x-y direction depending upon the angle of tilt of said optical effect layer. Methods for producing moving-ring effects are disclosed for example in EP 1 710 756 A1, U.S. Pat. No. 8,343,615, EP 2 306 222 A1. EP 2 325 677 A2, and US 2013/084411.

WO 2011/092502 A2 discloses an apparatus for producing moving-ring images displaying an apparently moving ring with changing viewing angle. The disclosed moving-ring images might be obtained or produced by using a device allowing the orientation of magnetic or magnetizable particles with the help of a magnetic field produced by the combination of a soft magnetizable sheet and a spherical magnet having its magnetic axis perpendicular to the plane of the coating layer and disposed below said soft magnetizable sheet.

The prior art moving ring images were generally produced by alignment of the magnetic or magnetizable particles according to the magnetic field of only one rotating or static magnet. Since the magnetic field lines of only one magnet generally bend relatively softly, i.e. have a low curvature, also the change in orientation of the magnetic or magnetizable particles is relatively soft over the surface of the OEL. Further, the intensity of the magnetic field decreases rapidly with increasing distance from the magnet when only a single magnet is used. This makes it difficult to obtain a highly dynamic and well-defined feature through orientation of the magnetic or magnetizable particles, and may result in visual effects that exhibit blurred ring edges.

WO 2011/092502 A2 discloses optical effect layers (OEL) comprising a plurality of magnetically oriented magnetic or magnetizable particles, which are dispersed in a coating. The specific magnetic orientation pattern of the disclosed OELs provides a viewer the optical effect or impression of a loop-shaped body that moves upon tilting of the OEL. The disclosed OELs are produced by using an apparatus comprising a soft magnetizable sheet and a spherical permanent magnet shaped having its North-South axis perpendicular to the plane of the coating layer comprising the magnetic or magnetizable particles to be oriented.

WO 2014/108404 A2 discloses optical effect layers (OEL) comprising a plurality of magnetically oriented non-spherical magnetic or magnetizable particles, which are dispersed in a coating. The specific magnetic orientation pattern of the disclosed OELs provides a viewer the optical effect or impression of a loop-shaped body that moves upon tilting of the OEL. Moreover, WO 2014/108404 A2 discloses OELs further exhibiting an optical effect or impression of a protrusion within the loop-shaped body caused by a reflection zone in the central area surrounded by the loop-shaped body. The disclosed protrusion provides the impression of a three-dimensional object, such as a half-sphere, present in the central area surrounded by the loop-shape body.

WO 2014/108303 A1 discloses optical effect layers (OEL) comprising a plurality of magnetically oriented non-spherical magnetic or magnetizable particles, which are dispersed in a coating. The specific magnetic orientation pattern of the disclosed OELs provides a viewer the optical effect or impression of a plurality of nested loop-shaped bodies surrounding one common central area, wherein said bodies exhibit a viewing-angle dependent apparent motion. Moreover, WO 2014/108303 A1 discloses OELs further comprising a protrusion which is surrounded by the innermost loop-shaped body and partly fills the central area defined thereby. The disclosed protrusion provides the illusion of a three-dimensional object, such as a half-sphere, present in the central area.

CN 104442055 B and CN 204566894U disclose devices for producing optical effect layers (OEL) comprising a plurality of magnetically oriented non-spherical magnetic or magnetizable particles, which are dispersed in a coating. The specific magnetic orientation pattern of the disclosed OELs provides a viewer the optical effect or impression of a loop-shaped body that moves upon tilting of the OEL. The disclosed OELs are produced by using a device comprising a first magnet and a second magnet, wherein the second magnet expands the tilted magnetic area of the first magnet by means of magnetic coupling.

A need remains for security features displaying an eye-catching bright loop-shaped effect on a substrate with good quality, wherein said security features can be easily verified, must be difficult to produce on a mass-scale with the equipment available to a counterfeiter, and which can be provided in great number of possible shapes and forms.

SUMMARY OF THE INVENTION

Accordingly, it is an object of the present invention to overcome the deficiencies of the prior art as discussed above.

In a first aspect, the present invention provides a process for producing an optical effect layer (OEL) (x10) on a substrate (x20) and optical effect layers (OEL) obtained thereof, said process comprising the steps of:
  i) applying on a substrate (x20) surface a radiation curable coating composition comprising non-spherical magnetic or magnetizable pigment particles, said radiation curable coating composition being in a first state, said first state being a liquid state;
  ii) exposing the radiation curable coating composition to a magnetic field of a magnetic assembly (x00) comprising:
    a) a first magnetic-field generating device (x30) having its North-South magnetic axis substantially perpendicular to the substrate (x20) surface and having length L1;
    b) a second magnetic-field generating device (x40) having its North-South magnetic axis substantially perpendicular to the substrate (x20) surface and having a length L3,
    c) a flat pole piece (x50) having a length L5,
      wherein the first magnetic-field generating device (x30) and the second magnetic-field generating device (x40) have a same magnetic field direction,
      wherein the first magnetic-field generating device (x30) faces the substrate (x20) and is disposed on top of the pole piece (x50),
      wherein the second magnetic-field generating device (x40) faces the environment and is disposed below the flat pole piece (x50),
      wherein the length L1 of the first magnetic-field generating device (x30) is smaller than the length L3 of the second magnetic-field generating device (x40),
      wherein the length L1 of the first magnetic-field generating device (x30) is smaller than the length L5 of the flat pole piece (x50), and
      wherein the length L3 of the second magnetic-field generating device (x40) is smaller than the length L5 of the pole piece (x50),
  so as to orient at least a part of the non-spherical magnetic or magnetizable pigment particles; and
    iii) at least partially curing the radiation curable coating composition of step ii) to a second state so as to fix the non-spherical magnetic or magnetizable pigment particles in their adopted positions and orientations,
    wherein the optical effect layer provides an optical impression of a moon crescent moving and rotating upon tilting the substrate comprising the optical effect layer (OEL).

In a further aspect, the present invention provides optical effect layers (OEL) prepared by the process described herein.

In a further aspect, a use of the optical effect layer (OEL) is provided for the protection of a security document against counterfeiting or fraud or for a decorative application.

In a further aspect, the present invention provides a security document or a decorative element or object comprising one or more optical effect layers (OELs) described herein.

Ina further aspect, the present invention provides a magnetic assembly (x00) such as those described herein for producing the optical effect layer (OEL) (x10) described herein and a use of said magnetic assembly (x00) for producing the optical effect layer (OEL) (x10) on the substrate (x20) described herein.

In a further aspect, the present invention provides a magnetic assembly (x00) such as those described herein for producing the optical effect layer (OEL) (x10) described herein, wherein the magnetic assembly (x00) is disposed in a holder (x01) mounted on a transferring device being preferably a rotating magnetic cylinder.

In a further aspect, the present invention provides a printing apparatus for producing the optical effect layer (OEL) described herein on a substrate such as those described herein, wherein the printing apparatus comprises at least one of the magnetic assemblies (x00) described herein. The printing apparatus described herein comprises a rotating magnetic cylinder comprising at least one of the magnetic assemblies (x00) described herein or a flatbed printing unit comprising at least one of the magnetic assemblies (x00) described herein.

In a further aspect, the present invention provides a use of the printing apparatus described herein for producing the optical effect layer (OEL) described herein on a substrate such as those described herein.

BRIEF DESCRIPTION OF DRAWINGS

FIGS. 3 and 3A-3D show pictures of OELs obtained by using the magnetic assembly (100) illustrated in FIG. 1 as viewed at different viewing angles with the first and second magnetic-field-generating device (130 and 140) being a disc-shaped magnetic-field-generating device.

FIG. 3E show pictures of an OEL obtained by using the magnetic assembly (100) illustrated in FIG. 1 as viewed at different viewing angles with the first and second magnetic-field-generating device (130 and 140) being a square-shaped magnetic-field-generating device.

FIGS. 5 and 6A-5C show pictures of OELs obtained by using the magnetic assembly (200) illustrated in FIG. 4 as viewed at different viewing angles.

FIG. 8 schematically illustrates a magnetic assembly (400) for producing an optical effect layer (OEL) (410) on a substrate (420) surface, wherein the magnetic assembly (400) comprises a) a first magnetic-field-generating device (430), in particular a disc-shaped magnetic-field-generating device, having a length L1, b) a second magnetic-field-generating device (440), in particular a disc-shaped magnetic-field-generating device, having a length L3, c) a flat pole piece (450), in particular a flat square-shaped pole piece, having a length L5 and d) a second flat pole piece (470), in particular a flat square-shaped second pole piece having a length L7.

FIGS. 9 and 9A show pictures of OELs obtained by using the magnetic assembly (400) illustrated in FIG. 8 as viewed at different viewing angles.

FIG. 10 schematically illustrates a magnetic assembly (500) for producing an optical effect layer (OEL) (510) on a substrate (520) surface, wherein the magnetic assembly (500) comprises a) a first magnetic-field-generating device (530), in particular a disc-shaped magnetic-field-generating device, having a length L1, b) a second magnetic-field-generating device (540), in particular a disc-shaped magnetic-field-generating device, having a length L3, c) a flat pole piece (550), in particular a flat square-shaped pole piece, having a length L5, d) a non-magnetic plate (560), in particular a square-shaped non-magnetic plate, and e) a second flat pole piece (570), in particular a flat square-shaped second pole piece.

FIGS. 11 and 11A show pictures of OELs obtained by using the magnetic assembly (500) illustrated in FIG. 10 as viewed at different viewing angles.

FIG. 12 schematically illustrates a magnetic assembly (600) for producing an optical effect layer (OEL) (610) on a substrate (620) surface, wherein the magnetic assembly (600) comprises a) a first magnetic-field-generating device (630), in particular a disc-shaped magnetic-field-generating device, having a length L1, b) a second magnetic-field-generating device (640), in particular a disc-shaped magnetic-field-generating device, having a length L3, c) a flat pole piece (650), in particular a flat square-shaped pole piece, having a length L5, d) a non-magnetic plate (660), in particular a square-shaped non-magnetic plate, and e) a magnetized plate (x80), in particular a square-shaped magnetized plate, comprising engraved indicia.

FIGS. 13 and 13A show pictures of OELs obtained by using the magnetic assembly (600) illustrated in FIG. 12 as viewed at different viewing angles.

FIG. 16 schematically illustrates a comparative magnetic assembly according to FIG. 6d of WO 2014/108303 A1 for producing an optical effect layer (OEL) (810) on a substrate (820) surface, wherein the magnetic assembly comprises a) a first magnetic-field-generating device (830), in particular a disc-shaped magnetic-field-generating device, b) a second magnetic-field-generating device (840), in particular a disc-shaped magnetic-field-generating device, c) a non-flat pole piece (890), in particular a disc-shaped pole piece having a U-shaped cross section and d) a flat pole piece (891), in particular a flat disc-shaped pole piece.

FIGS. 17 and 17A shows pictures of OELs obtained by using the magnetic assembly illustrated in FIG. 16 as viewed at different viewing angles.

DETAILED DESCRIPTION

Definitions

Figure 1:
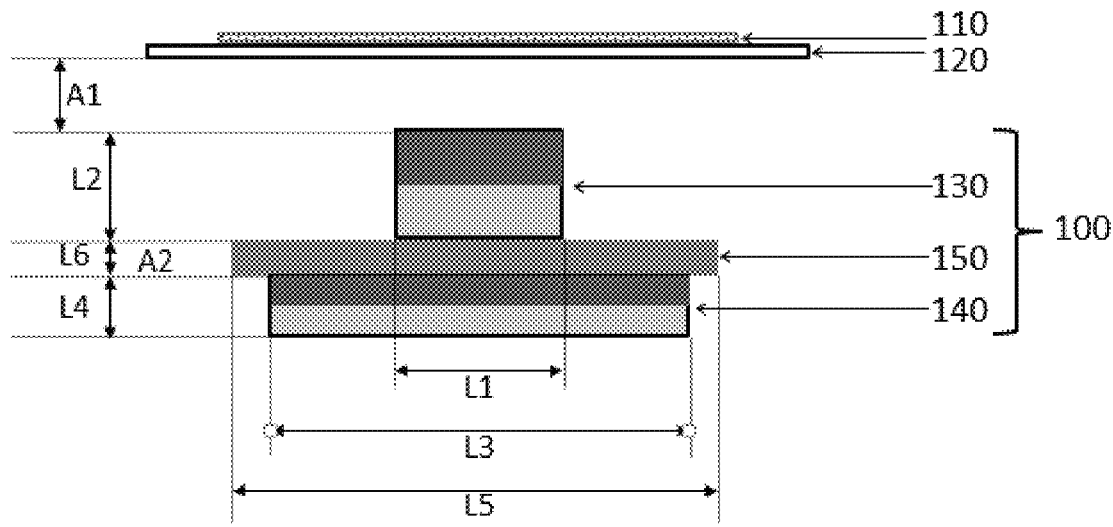
FIG. 1 schematically illustrates a magnetic assembly (100) for producing an optical effect layer (OEL) (110) on a substrate (120) surface, wherein the magnetic assembly (100) comprises a) a first magnetic-field-generating device (130), in particular a disc-shaped or a square-shaped magnetic-field-generating device, having a length L1, b) a second magnetic-field-generating device (140), in particular a disc-shaped a square-shaped magnetic-field-generating device, having a length L3, and c) a flat pole piece (150), in particular a flat square-shaped pole piece, having a length L5.

The following definitions are to be used to interpret the meaning of the terms discussed in the description and recited in the claims.

As used herein, the indefinite article "a" indicates one as well as more than one and does not necessarily limit its referent noun to the singular. and U.S. Pat. No. 6,410,130 disclose cholesteric multilayer pigment particles which comprise the sequence $A^1B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical magnetic or magnetizable pigment particles described herein may be surface treated so at to protect them against any deterioration that may occur in the radiation curable coating composition and/or to facilitate their incorporation in the radiation curable coating composition; typically corrosion inhibitor materials and/or wetting agents may be used.

The process for producing the optical effect layers (OEL) (x10) described herein on the substrate (x20) described herein comprises a step ii) of exposing the radiation curable coating composition to the magnetic field of the magnetic assembly (x00) described herein. Also described herein are magnetic assemblies (x00) and processes using said magnetic assemblies (x00) for producing an OEL (x10) such as those described herein on the substrate (x20) described herein, said OEL comprising the non-spherical magnetic or magnetizable pigment particles being oriented in the cured radiation curable coating composition such as described herein.

The magnetic assembly (x00) comprises a) the first magnetic-field generating device (x30) having the length L1 described herein, b) the second magnetic-field generating device (x40) having the length L3 described herein, and c) the flat pole piece (x50) having the length L5 described herein.

According to one embodiment, the magnetic assembly (x00) described herein is disposed or encased in a holder (x01) mounted on a transferring device, wherein said transferring device is a rotating magnetic cylinder or a magnetic orienting printing unit. Preferably, the magnetic assembly (x00) described herein is disposed or encased in the holder (x01) described herein, wherein said holder (x01) is mounted on the rotating magnetic cylinder, in particular mounted on circumferential grooves or transverse grooves of the rotating magnetic cylinder.

Figure 2:
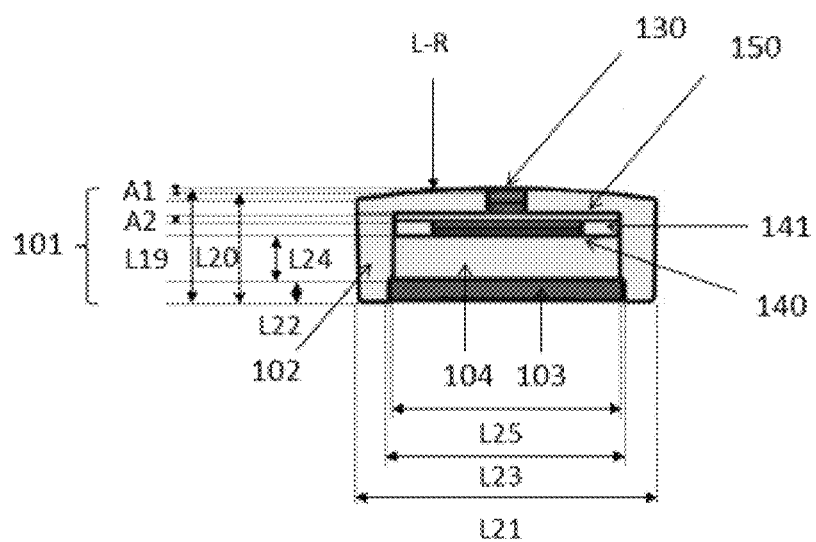
FIG. 2 schematically illustrate a cross-section (of a magnetic assembly (100) enclosed in a holder (101), wherein the magnetic assembly (100) comprises a) a first magnetic-field-generating device (130), in particular a disc-shaped or a square-shaped magnetic-field generating device, b) a second magnetic-field-generating device (140), in particular a disc-shaped or a square-shaped magnetic-field-generating device, and c) a flat pole piece (150), in particular a flat square-shaped pole piece, and wherein the holder (101) comprises a domed-shaped lid (102) having a length L21, a central thickness L19 and an edge thickness L20, a bottom locking (103) having a length L23 and a thickness L22, and an optional wedge 104 having a length L25 and a thickness (124).

As illustrated in FIG. 2, the magnetic assembly (x00) for producing the optical effect layer described herein is preferably disposed or encased in the holder (x01) described herein, wherein said holder (x01) comprises a domed-shaped lid (x02) (i.e. a lid having a curved surface) to protect the magnetic assembly (x00) from contamination and mechanical damage and to provide a smooth surface for supporting a substrate (x20) carrying the OEL (x10). The holder (101) and the domed-shaped lid (102) have a length and a width L21, a thickness L19 at the center of the domed-shaped lid (102) and a thickness L20 at the edge of the domed-shaped lid (102). The top surface of the domed-shaped lid (102) is a curved surface whose curvature is that of a circle having a radius (L-R). The external top surface of the domed-shaped lid (x02) preferably seamlessly conforms to the external surface of the transferring device described herein, preferably to the external surface of the rotating magnetic cylinder described herein, wherein the magnetic assembly (x10) described herein is disposed or encased. The domed-shaped lid (x02) serves as a separating element between the magnetic assembly (x00) and the substrate (x20) carrying the OEL (x10). As illustrated in FIG. 2, the domed-shaped lid (102) may further comprise a recess to secure the first magnetic-field generating device (130) in an alignment with the second magnetic-field generating device (140) and the flat pole piece (150).

The holder (x01) described herein comprises a bottom locking (x03) to protect the magnetic assembly (x00) from contamination and mechanical damage. The bottom locking (103) has a length and a width L23 and a thickness L24. The bottom locking (x03) may be inserted in the bottom surface of the domed-shaped lid (x02) so as to be flush with the bottom surface of the domed-shaped lid (x02).

The domed-shaped lid (x02) and the bottom locking (x03) of the holder (x01) described herein are independently made of one or more non-magnetic materials selected from the same group of low conducting materials, non-conducting materials and mixtures thereof such as the non-magnetic materials described herein for the non-magnetic plate (x60).

The holder (x01) described herein may further comprise a non-magnetic wedge (x04) for supporting the magnetic assembly (x00) and varying the distance A1 between the top surface of the magnetic assembly (x00) and the substrate (x20) carrying the OEL (110). The non-magnetic wedge (104) a length L25 and a thickness L24. The non-magnetic wedge (x04) described herein is made of one or more non-magnetic materials selected from the same group of low conducting materials, non-conducting materials and mixtures thereof such as the non-magnetic materials described herein for the non-magnetic plate (x60). Advantageously, the domed-shaped lid (x02) and the non-magnetic wedge (x04) provide an appropriate distance between the magnetic assembly (x00) and the substrate (x20) in contact with the domed-shaped lid (x02).

The holder (x01) described herein may further comprise a non-magnetic matrix (x41) to secure the second magnetic-field generating device (x40) in an alignment with the first magnetic-field generating device (x30) and the flat pole piece (x50). The non-magnetic matrix (x41) typically comprises a void suitable for receiving the second magnetic-field-generating device (x40), said void preferably having the same shape and the same dimensions as the second magnetic-field-generating device (x40). The non-magnetic matrix (x41) described herein is made of one or more non-magnetic materials selected from the same group of low conducting materials, non-conducting materials and mixtures thereof such as the non-magnetic materials described herein for the non-magnetic plate (x60).

Each of the first magnetic-field generating device (x30) and the second magnetic-field generating device (x40) has its North-South magnetic axis substantially perpendicular to the substrate (x20) surface and both of said first magnetic-field generating device (x30) and said second magnetic-field generating device (x40) have the same magnetic field direction, i.e. either both of said first magnetic-field generating device (x30) and said second magnetic-field generating device (x40) have their North Pole pointing preferably from the group consisting of Nd2Fe14B and SmCo5. Particularly preferred are easily workable permanent-magnetic composite materials that comprise a permanent-magnetic filler, such as strontium-hexaferrite (SrFe12O19) or neodymium-iron-boron (Nd2Fe14B) powder, in a plastic- or rubber-type matrix.

The magnetic assembly (x00) described herein comprises c) the flat pole piece (x50) described herein. By "flat", it is meant that said pole piece does not comprise any protrusions or projections extending outside the surface of said pole piece, i.e. lacks any protrusions or projections extending outside the surface of said pole piece. FIG. 1-6 illustrate magnetic assemblies (x00) comprising a flat pole piece (x50) whereas the comparative FIG. 8 illustrates a magnetic assembly comprising a non-flat pole piece (x90), in particular pole pieces comprising an indentation and a U-shaped cross-section and a flat pole piece (x91).

The flat pole piece (x50) described herein is disposed between the first magnetic-field generating device (x30) and the second magnetic-field generating device (x40) or, in other words, the first magnetic-field generating device (x30) is disposed on top of the flat pole piece (x50) and the second magnetic-field generating device (x40) is disposed below the flat pole piece (x50). The flat pole piece (x50) may be in direct contact with the first and second magnetic-field generating device (x30, x40) or may be separated from the first and second magnetic-field generating device (x30, x40).

A pole piece denotes a structure composed of a material having high magnetic permeability, preferably a permeability between about 2 and about 1,000,000 N.A-2 (Newton per square Ampere), more preferably between about 5 and about 50,000 N.A-2 and still more preferably between about 10 and about 10,000 N.A-2. Pole piece serve to direct the magnetic field produced by magnets. The flat pole piece (x50) described herein may be made from iron or from a plastic material in which magnetizable particles are dispersed. Preferably the flat pole piece (x50) described herein is made of iron.

The flat pole piece (x50) is a solid-shaped flat pole piece and more preferably a flat disc-shaped pole piece or a flat square-shaped pole piece.

The flat pole piece (x50) described herein has a length L5, wherein said length L5 is larger than the length L3 of the second magnetic-field generating device (x40). For embodiments comprising a flat disc-shaped pole piece (x50), the length L5 described herein refers and corresponds to the diameter of said pole piece (x50). For embodiments comprising a flat square-shaped pole piece (x50), the length L5 described herein refers and corresponds to the width of said pole piece.

The flat pole piece (x50) may be disposed symmetrically or non-symmetrically with the first magnetic-field generating device (x30) described herein and the second magnetic-field generating device (x40) described herein. Preferably, and for reasons of mechanical balance and design purpose, the flat pole piece (x50) is disposed symmetrically with the first magnetic-field generating device (x30) described herein and the second magnetic-field generating device (x40) described herein.

According to one embodiment shown in FIGS. 1 and 2 and 3A-3D, the magnetic assembly (100) described herein comprises a) the first magnetic-field generating device (130), in particular the first disc-shaped magnetic-field generating device (130), described herein, b) the second magnetic-field generating device (140), preferably the second disc-shaped magnetic-field generating device (140), described herein and c) the flat pole piece (150), preferably the flat square-shaped pole piece (150), described herein; wherein the first and second disc-shaped magnetic-field generating device (130, 140) have their North-South magnetic axis substantially perpendicular to the substrate (120) surface and have their North Pole pointing towards the substrate (120); wherein the diameter (L1) of the first disc-shaped magnetic-field generating device (130) is smaller than the diameter (L3) of the second disc-shaped magnetic-field generating device (140) and the diameter (L3) of the second disc-shaped magnetic-field generating device (140) is smaller than the diameter (L5) of the flat square-shaped pole piece (150); wherein the first disc-shaped magnetic-field generating device (130) is in direct contact and is disposed on top of the flat square-shaped pole piece (150); wherein the square-shaped pole piece (150) is in direct contact and is disposed on top of the second disc-shaped magnetic-field generating device (140); and wherein the origin (i.e. the point where the diameters intersect) of the first disc-shaped magnetic-field generating device (130), of the second disc-shaped magnetic-field generating device (140) and of the flat square-shaped pole piece (150) are aligned. Preferably, the distance (A1) between the upmost surface of the first disc-shaped magnetic-field generating device (130) and the lower surface of the substrate (120) facing the magnetic assembly (100) described herein is preferably between about 0 and about 5 mm, more preferably between about 0 and about 2.5 mm and still more preferably between about 0 and about 1 mm.

The magnetic assembly (x00) described herein may further comprise a non-magnetic plate (x60).

The non-magnetic plate (x60) described herein acts as a spacer between the first magnetic-field generating device (x30) and the second magnetic-field generating device (x40). The non-magnetic plate (x60) described herein is disposed between the first magnetic-field generating device (x30) and the second magnetic-field generating device (x40). The non-magnetic plate (x60) described herein may be disposed below (see for example FIG. 4) or may be disposed on top of (see for example FIG. 3) the flat pole piece (x50).

The non-magnetic plate (x60) described herein is independently made of one or more non-magnetic materials. The non-magnetic materials are preferably selected from the group consisting of low conducting materials, non-conducting materials and mixtures thereof, such as for example engineering plastics and polymers, aluminum, aluminum alloys, titanium, titanium alloys and austenitic steels (i.e. non-magnetic steels). Engineering plastics and polymers include without limitation polyaryletherketones (PAEK) and its derivatives polyetheretherketones (PEEK), poletherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS.

The non-magnetic plate (x60) described herein may have any shape. Preferably, the non-magnetic plate (x60) described herein is a disc-shaped non-magnetic plate or a square-shaped non-magnetic plate, more preferably a square-shaped non-magnetic plate.

The non-magnetic plate (x60) described herein has a length L7. For embodiments comprising a disc-shaped non-magnetic plate (x60), the length L7 described herein refers and corresponds to the diameter of said non-magnetic plate. For embodiments comprising a square-shaped non-magnetic plate (x60), the length L7 described herein refers and corresponds to the width of said non-magnetic plate.

According to a preferred embodiment and for reasons of mechanical balance, the length L7 of the non-magnetic plate (x60) (diameter L7 in case of disc-shaped non-magnetic plate; width L7 in case of a square-shaped non-magnetic plate) is the same as the length L5 of the flat pole piece (x50).

The non-magnetic plate (x60) may be disposed symmetrically or non-symmetrically with the first magnetic-field generating device (x30) described herein, the second magnetic-field generating device (x40) and the flat pole piece (x50) described herein. Preferably and for reasons of mechanical balance, the non-magnetic plate (x60) is disposed symmetrically with the first magnetic-field generating device (x30) described herein, the second magnetic-field generating device (x40) and the flat pole piece (x50) described herein.

Figure 4:
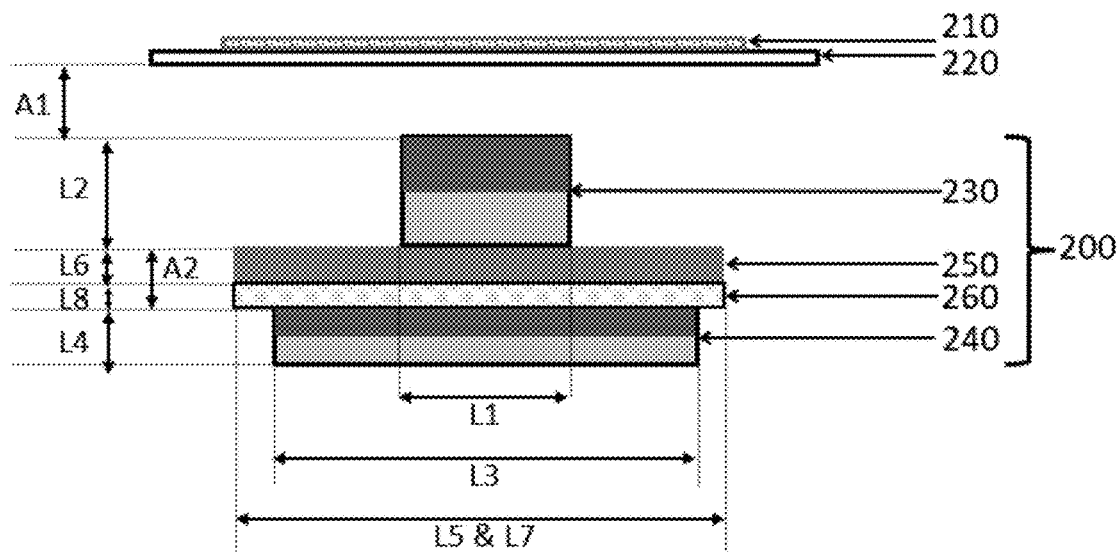
FIG. 4 schematically illustrates a magnetic assembly (200) for producing an optical effect layer (OEL) (210) on a substrate (220) surface, wherein the magnetic assembly (200) comprises a) a first magnetic-field-generating device (230), in particular a disc-shaped magnetic-field-generating device, having a length L1, b) a second magnetic-field-generating device (240), in particular a disc-shaped magnetic-field-generating device, having a length L3, c) a flat pole piece (250), in particular a flat square-shaped or a disc-shaped pole piece, having a length L5 and d) a non-magnetic plate (260), in particular a square-shaped non-magnetic plate.

According to one embodiment shown in FIG. 4, the magnetic assembly (200) described herein comprises a) the first magnetic-field generating device (230), in particular the first disc-shaped magnetic-field generating device (230), described herein, b) the second magnetic-field generating device (240), preferably the second disc-shaped magnetic-field generating device (240), described herein, c) the flat pole piece (250), preferably the flat square-shaped pole piece or flat disc-shaped pole piece (250), described herein, and d) the non-magnetic plate (260), preferably the square-shaped non-magnetic plate (260), described herein; wherein the first and second disc-shaped magnetic-field generating device (230, 240) have their North-South magnetic axis substantially perpendicular to the substrate (220) surface and have their North pointing towards the substrate (220); wherein the diameter (L1) of the first disc-shaped magnetic-field generating device (230) is smaller than the diameter (L3) of the second disc-shaped magnetic-field generating device (230), the diameter (L3) of the second disc-shaped magnetic-field generating device (230) is smaller than the width (L5) of the flat square-shaped pole piece (250) or smaller than the diameter (L5) of the disc-shaped pole piece (250), and the width (L5) of the flat square-shaped pole piece (250) or the diameter (L5) of the of the disc-shaped pole piece (250) is the same as the width (L7) of the square-shaped non-magnetic plate (260); wherein the first disc-shaped magnetic-field generating device (230) is in direct contact and is disposed on top of the flat square-shaped pole piece (250) or flat disc-shaped pole piece (250); wherein the flat disc-shaped pole piece or flat square-shaped pole piece (250) is in direct contact and is disposed on top of the square-shaped non-magnetic plate (260); wherein the square-shaped non-magnetic plate (260) is in direct contact and is disposed on top of the second disc-shaped magnetic-field generating device (240); and wherein the origin of the first disc-shaped magnetic-field generating device (230), of the second disc-shaped magnetic-field generating device (240), of the square-shaped flat pole piece (250) or disc-shaped pole piece (250) and of the square-shaped non-magnetic plate (260) are aligned. Preferably, the distance (A1) between the upmost surface of the first disc-shaped magnetic-field generating device (230) and the lower surface of the substrate (220) facing the magnetic assembly (200) described herein is preferably between about 0 and about 5 mm, more preferably between about 0 and about 2.5 mm and still more preferably between about 0 and about 1 mm.

Figure 6:
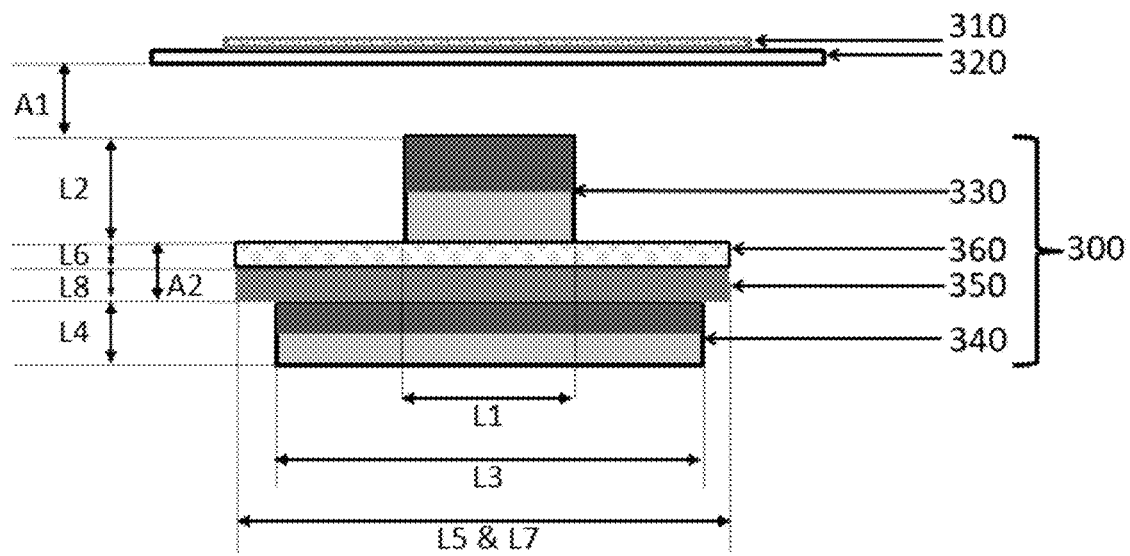
FIG. 6 schematically illustrates a magnetic assembly (300) for producing an optical effect layer (OEL) (310) on a substrate (320) surface, wherein the magnetic assembly (300) comprises a) a first magnetic-field-generating device (330), in particular a disc-shaped magnetic-field-generating device, having a length L1, b) a second magnetic-field-generating device (340), in particular a disc-shaped magnetic-field-generating device, having a length L3, c) a flat pole piece (350), in particular a flat square-shaped pole piece, having a length L5 and d) a non-magnetic plate (360), in particular a square-shaped non-magnetic plate.

According to another embodiment shown in FIG. 6, the magnetic assembly (300) described herein comprises a) the first magnetic-field generating device (330), in particular the first disc-shaped magnetic-field generating device (330), described herein, b) the second magnetic-field generating device (340), preferably the second disc-shaped magnetic-field generating device (340), described herein, c) the flat pole piece (350), preferably the flat square-shaped pole piece (350), described herein, and d) the non-magnetic plate (360), preferably the non-magnetic square-shaped plate (360), described herein; wherein the first and second disc-shaped magnetic-field generating device (330, 340) have their North-South magnetic axis substantially perpendicular to the substrate (320) surface and have their North Pole pointing towards the substrate (320); wherein the diameter (L1) of the first disc-shaped magnetic-field generating device (330) is smaller than the diameter (L3) of the second disc-shaped magnetic-field generating device (340), the diameter (L3) of the second disc-shaped magnetic-field generating device (340) is smaller than the width (L5) of the flat square-shaped pole piece (350), and the width (L5) of the flat square-shaped pole piece (350) is the same as the width (L7) of the non-magnetic square-shaped plate (360); wherein the first disc-shaped magnetic-field generating device (330) is in direct contact and is disposed on top of the square-shaped non-magnetic plate (360); wherein the square-shaped non-magnetic plate (360) is in direct contact and is disposed on top of the flat square-shaped pole piece (350); wherein the flat square-shaped pole piece (350) is in direct contact and is disposed on top of the second disc-shaped magnetic-field generating device (340); and wherein the origin of the first disc-shaped magnetic-field generating device (330), of the second disc-shaped magnetic-field generating device (340), of the square-shaped flat pole piece (350) and of the square-shaped non-magnetic plate (360) are aligned. Preferably, the distance (A1) between the upmost surface of the first disc-shaped magnetic-field generating device (330) and the lower surface of the substrate (320) facing the magnetic assembly (300) described herein is preferably between about 0 and about 5 mm, more preferably between about 0 and about 2.5 mm and still more preferably between about 0 and about 1 mm.

The magnetic assembly (x00) described herein may further comprise a second flat pole piece (x70). The second flat pole piece (x70) described herein is disposed below the second magnetic-field generating device (x40) and thus faces the environment (see FIGS. 8 and 10).

The second flat pole piece (x70) is a solid-shaped flat pole pieces and more preferably a flat disc-shaped pole piece or a flat square-shaped and still more preferably has the same shape as the flat pole piece (x50).

The second flat pole piece (x70) is a structure composed of a material having high magnetic permeability such as described herein for the flat pole piece (x50). Preferably the second flat pole piece (x70) described herein is made of iron.

The second flat pole piece (x70) described herein has a length L9. For embodiments comprising a second flat disc-shaped pole piece (x70), the length L9 described herein refers and corresponds to the diameter of said second flat pole piece (x70). For embodiments comprising a second flat square-shaped pole piece (x70), the length L9 described herein refers and corresponds to the width of said second flat pole piece. According to a preferred embodiment, and for reasons of mechanical balance and for design purpose, the length L9 of the second flat square-shaped pole piece (x70) is the same as the length L5 of the flat pole piece (x50).

The second flat pole piece (x70) may be disposed symmetrically or non-symmetrically with the first magnetic-field generating device (x30) described herein, the second magnetic-field generating device (x40), the flat pole piece (x50) described herein and the non-magnetic plate (x60) described herein, when present. Preferably and for reasons of mechanical balance, the second flat pole piece (x70) is disposed symmetrically with the first magnetic-field generating device (x30) described herein, the second magnetic-field generating device (x40), the flat pole piece (x50) described herein and the non-magnetic plate (x60) described herein, when present.

According to one embodiment shown in FIG. 8, the magnetic assembly (400) described herein comprises a) the first magnetic-field generating device (430), in particular the first disc-shaped magnetic-field generating device (430), described herein, b) the second magnetic-field generating device (440), preferably the second disc-shaped magnetic-field generating device (440), described herein, c) the flat pole piece (450), preferably the flat square-shaped pole piece (450), described herein, and d) the second flat pole piece (470), preferably the second flat square-shaped pole piece (470), described herein; wherein the first and second disc-shaped magnetic-field generating device (430, 440) have their North-South magnetic axis substantially perpendicular to the substrate (420) surface and have their North Pole pointing towards the substrate (420); wherein the diameter (L1) of the first disc-shaped magnetic-field generating device (430) is smaller than the diameter (L3) of the second disc-shaped magnetic-field generating device (440), the diameter (L3) of the second disc-shaped magnetic-field generating device (440) is smaller than the width (L5) of the flat square-shaped pole piece (450), and the width (L5) of the flat square-shaped pole piece (450) is the same as the width (L7) of the second flat square-shaped pole piece (470); wherein the first disc-shaped magnetic-field generating device (430) is in direct contact and is disposed on top of flat square-shaped pole piece (450); wherein the flat square-shaped pole piece (450) is in direct contact and is disposed on top of the second disc-shaped magnetic-field generating device (440); wherein the second disc-shaped magnetic-field generating device (440) is in direct contact and is disposed on top of the second flat square-shaped pole piece (470); and wherein the origin of the first disc-shaped magnetic-field generating device (430), of the second disc-shaped magnetic-field generating device (440), of the square-shaped flat pole piece (450) and of the second square-shaped pole piece (470) are aligned. Preferably, the distance (A1) between the upmost surface of the first disc-shaped magnetic-field generating device (430) and the lower surface of the substrate (420) facing the magnetic assembly (400) described herein is preferably between about 0 and about 5 mm, more preferably between about 0 and about 2.5 mm and still more preferably between about 0 and about 1 mm.

According to one embodiment, the magnetic assembly (x00) described herein comprises the first magnetic-field generating device (x30), the second magnetic-field generating device (x40) described herein, the flat pole piece (x50) described herein, the non-magnetic plate (x60) described herein and the second flat pole piece (x70) described herein.

According to one embodiment shown in FIG. 10, the magnetic assembly (500) described herein comprises a) the first magnetic-field generating device (530), in particular the first disc-shaped magnetic-field generating device (530), described herein, b) the second magnetic-field generating device (540), preferably the second disc-shaped magnetic-field generating device (540), described herein, c) the flat pole piece (550), preferably the flat square-shaped pole piece (550), described herein, d) the second flat pole piece (570), preferably the second flat square-shaped pole piece (570), described herein and e) the non-magnetic plate (560), preferably the square-shaped non-magnetic plate (560), described herein; wherein the first and second disc-shaped magnetic-field generating device (530, 540) have their North-South magnetic axis substantially perpendicular to the substrate (520) surface and have their North Pole pointing towards the substrate (520); wherein the diameter (L1) of the first disc-shaped magnetic-field generating device (530) is smaller than the diameter (L3) of the second disc-shaped magnetic-field generating device (540), the diameter (L3) of the second disc-shaped magnetic-field generating device (540) is smaller than the width (L5) of the flat shaped-shaped pole piece (550), and the width (L5) of the flat square-shaped pole piece (550) is the same as the width (L7) of the non-magnetic square-shaped plate (560) and is the same as the width (L9) of the second flat square-shaped pole piece (570); wherein the first disc-shaped magnetic-field generating device (530) is in direct contact and is disposed on top of the flat square-shaped pole piece (550); wherein the flat square-shaped pole piece (550) is in direct contact and is disposed on top of the non-magnetic square-shaped plate (560); wherein the non-magnetic square-shaped plate (560) is in direct contact and is disposed on top of the second disc-shaped magnetic-field generating device (540); wherein the second disc-shaped magnetic-field generating device (540) is in direct contact and is disposed on top of the second flat square-shaped pole piece (570); and wherein the origin of the first disc-shaped magnetic-field generating device (530), of the second disc-shaped magnetic-field generating device (540), of the square-shaped flat pole piece (550), of the second flat square-shaped pole piece (570) and of the non-magnetic square-shaped plate (560) are aligned. Preferably, the distance (A1) between the upmost surface of the first disc-shaped magnetic-field generating device (530) and the lower surface of the substrate (520) facing the magnetic assembly (500) described herein is preferably between about 0 and about 5 mm, more preferably between about 0 and about 2.5 mm and still more preferably between about 0 and about 1 mm.

The magnetic assembly (x00) described herein may further comprise a magnetized plate (x80) comprising one or more surface reliefs, engravings and/or cut-outs representing one or more indicia, wherein said magnetized plate (x80) is disposed on top of the first magnetic-field generating device (x30) thus facing the substrate (x20) (see FIG. 12). As used herein, the term "indicia" shall mean designs and patterns, including without limitation symbols, alphanumeric symbols, motifs, letters, words, numbers, logos and drawings. The one or more surface reliefs, engravings and/or cut-outs of the magnetized plate (x80) bear the indicia are transferred to the OEL in its non-cured state by locally modifying the magnetic field generated by the magnetic assembly (x00) described herein. Advantageously, the magnetized plate (x80) may be comprised on the top surface of the domed-shaped lid (x02) described herein.

Suitable examples of magnetized plates (x80) comprising the one or more surface reliefs, engravings and/or cut-outs described herein for the present invention can be found in in WO 2005/002866 A1. WO 2008/046702 A1 and WO 2008/139373 A1.

The magnetized plate (x80) described herein has a length L11. For embodiments comprising a square-shaped magnetized plate (x80), the length L11 described herein refers and corresponds to the width of said magnetized plate. controlled engraving tools), gaseous or liquid jet ablation tools, by chemical etching, electro-chemical etching and laser ablation tools (e.g. CO2-, Nd-YAG or excimer lasers). As is understood by the skilled man and described herein, the magnetized plate (x80) described herein, in particular the magnetized plate (x80) made of the composite material comprising the polymer and the permanent magnetic powder material described herein, can also be cut or molded to a particular size and shape, rather than engraved. Holes may be cut out of it, or cut-out pieces may be assembled on a support.

The one or more engravings and cut-outs of the magnetized plate (x80) in particular the magnetized plate (x80) made of the composite material comprising the polymer and the permanent magnetic powder material described herein, may be filled up with a polymer, which may contain fillers. Said filler may be a soft magnetic material, for modifying the magnetic flux at the locations of the one or more engravings/cut-outs, or it may be any other type of magnetic or non-magnetic material, in order to modify the magnetic field properties, or to simply produce a smooth surface. The magnetized plate (x80), in particular the magnetized plate (x80) made of the composite material comprising the polymer and the permanent magnetic powder material described herein, may additionally be surface-treated for facilitating the contact with the substrate, reducing friction and/or wear and/or electrostatic charging in a high-speed printing application.

Preferably, the magnetized plate (x80) described herein is made of the composite material comprising the polymer and the permanent magnetic powder material described herein, preferably made of plastoferrite, and comprises one or more engravings. The plastoferrite plate is engraved with a desired high resolution pattern having the form of indicia, either using a mechanical engraving tool, or, preferably, using an automated CO2-, Nd-YAG-laser engraving tool.

The magnetized plate (x80) described herein made of the composite material comprising the polymer and the permanent magnetic powder material described herein, preferably made of plastoferrite may be provided as a pre-formed plate and the one or more engravings and subsequently apply surface irregularities representing the indicia in accordance with the specific requirements of use.

According to one embodiment, the magnetic assembly (x00) described herein comprises the first magnetic-field generating device (x30), the second magnetic-field generating device (x40) described herein, the flat pole piece (x50) described herein, the non-magnetic plate (x60) described herein and the magnetized plate (x80) described herein.

According to one embodiment shown in FIG. 12, the magnetic assembly (600) described herein the magnetic assembly (600) described herein comprises a) the first magnetic-field generating device (630), in particular the first disc-shaped magnetic-field generating device (630), described herein, b) the second magnetic-field generating device (640), preferably the second disc-shaped magnetic-field generating device (640), described herein, c) the flat pole piece (650), preferably the flat square-shaped pole piece (650), described herein, d) the non-magnetic plate (660), preferably the square-shaped non-magnetic plate (660), described herein, and e) the magnetized plate (680), preferably the square-shaped magnetized plate (680), described herein; wherein the first and second disc-shaped magnetic-field generating device (630, 640) have their North-South magnetic axis substantially perpendicular to the substrate (620) and have their North Pole pointing towards the substrate (620); the magnetized plate (680), preferably the square-shaped magnetized plate (680), described herein; wherein the diameter (L1)

As mentioned hereabove, the optical effect layer (OEL) produced according to the present invention may be used for decorative purposes as well as for protecting and authenticating a security document. Typical examples of decorative elements or objects include without limitation luxury goods, cosmetic packaging, automotive parts, electronic/electrical appliances, furniture and fingernail lacquers.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

EXAMPLES

Magnetic assemblies illustrated in FIG. 1-12 were used to orient non-spherical optically variable magnetic pigment particles in a printed layer of the UV-curable screen printing ink described in Table 1 so as to produce optical effect layers (OELs) shown in FIG. 1B-11. Comparative assemblies illustrated in FIGS. 14 and 16 were used to orient non-spherical optically variable magnetic pigment particles in a printed layer of the UV-curable screen printing ink described in Table 1 so as to produce comparative optical effect layers (OELs) shown in FIGS. 15A and 17A.

The UV-curable screen printing ink was applied onto a black commercial paper (a fiduciary standard paper BNP 90 g/m2, from Papierfabrik Louisenthal, 50×50 mm), said application being carried out by hand screen printing using a T90 screen so as to form a coating layer (36 mm×36 mm) having a thickness of about 20 □m. The substrate carrying the applied layer of the UV-curable screen printing ink was disposed on the magnetic assembly. The so-obtained magnetic orientation pattern of the non-spherical optically variable pigment particles was, partially simultaneously to the orientation step, fixed by UV-curing the printed layer comprising the pigment particles using a UV-LED-lamp from Phoseon (Type FireFlex 50×75 mm, 395 nm, 8 W/cm$^2$).

TABLE 1

| UV-curable screen printing ink (coating composition): | |
|---|---|
| Epoxyacrylate oligomer | 28% |
| Trimethylolpropane triacrylate monomer | 19.5% |
| Tripropyleneglycol diacrylate monomer | 20% |
| Genorad ™ 16 (Rahn) | 1% |

TABLE 1-continued

| UV-curable screen printing ink (coating composition): | |
|---|---|
| Aerosil ® 200 (Evonik) | 1% |
| Speedcure TPO-L (Lambson) | 2% |
| IRGACURE ® 500 (BASF) | 6% |
| Genocure EPD (Rahn) | 2% |
| Tego ® Foamex N (Evonik) | 2% |
| Non-spherical optically variable magnetic pigment particles (7 layers)(*) | 16.5% |

(*)gold-to-green optically variable magnetic pigment particles having a flake shape of diameter d50 about 9 μm and thickness about 1 μm, obtained from Viavi Solutions, Santa Rosa. CA.

Devices and Materials

The first magnetic-field-generating devices (x30) and the second magnetic-field-generating devices (x40) were made of NdFeB N30. As shown in FIG. 1-12, the magnetic assemblies (x00) independently comprised the first magnetic-field-generating device (x30) and the second magnetic-field-generating device (x40), wherein said first magnetic-field-generating device (x30) was disposed on top of said second magnetic-field-generating device (x40) and wherein both of said devices (x30, x40) had their North-South magnetic axis substantially perpendicular to the substrate (x20) surface with the North pole pointing towards the substrate (x20).

As shown in FIG. 1-12, the magnetic assemblies (x00) independently comprised the flat pole piece (x50), wherein said flat pole piece (x50) was disposed between the first magnetic-field-generating device (x30) and the second magnetic-field-generating device (x40). The flat pole pieces (x50) were independently made of iron.

As shown in FIGS. 4, 6, 10 and 12, the magnetic assemblies (x00) independently comprised the non-magnetic plate (x60), wherein said non-magnetic plate (x60) was disposed between the first magnetic-field-generating device (x30) and the second magnetic-field-generating device (x40). The non-magnetic plates (x60), when present, were independently made of POM.

As shown in FIG. 8-10, the magnetic assemblies (x00) independently comprised the second flat pole piece (x70), wherein said second flat pole piece (x70) was disposed below the second magnetic-field-generating device (x40) and faced the environment. The second flat pole pieces (x70), when present, were independently made of iron.

The magnetized plate (x80) comprising an indicium having the shape of "50" (x80) was made of plastoferrite (TROMAFLEX® from Max Baermann GmbH, Bergisch Gladbach). The magnetized plate (x80) was magnetized in a direction perpendicular to the substrate (x20) surface and then engraved on a computer-controlled mechanical engraving station with a geometrical design ("50" indicium) having a dimension of 2.5 mm×3.0 mm. The engravings of the square-shaped magnetized plate (x80) had a depth of engraving of about 0.2 mm and a width of line of about 1 mm). As shown in FIG. 12, the magnetic assemblies (600) independently comprised the magnetized plate (680), wherein said magnetized plate (680) was disposed on top of the first magnetic-field-generating device (630) and below the substrate (620).

The non-flat pole pieces (x90) and the flat pole piece (x91), when present, were independently made of iron.

The dimensions and shape of the first magnetic-field-generating device (x30), the second magnetic-field-generating device (x40), the flat pole piece (x50), the non-magnetic plate (x60), the second flat pole piece (x70) and the magnetized plate (x80) of Examples E1-E13 are provided in Table 2. The distance A1 between the top surface of the first magnetic-field-generating device (x30) and the lower surface of the substrate (x20) facing the magnetic assembly (x00) and the distance A2 between the top surface of the second magnetic-field-generating device (x40) and the lower surface of the first magnetic-field-generating devices (x30) of Examples E1-E13 are provided in Table 2.

The dimensions and the shape of the first magnetic-field-generating device (x30), the second magnetic-field-generating device (x40), the flat pole piece (x91) and the non-flat pole piece (x90) of Comparative Examples C1-C2 are provided in Table 3. The distance A1 between the top surface of the first magnetic-field-generating device (x30) and the lower surface of the substrate (x20) facing the magnetic assembly (x00) and the distance A2 between the top surface of the second magnetic-field-generating device (x40) and the lower surface of the first magnetic-field-generating device (x30) of Comparative Examples C1-C2 are provided in Table 3.

Holders (x01) were independently used for inserting the magnetic assemblies (x00) used to prepare Examples 1-13 (E1-E13) and Comparative Examples 1-2 (C1-C2). The holder (101) illustrated in FIG. 2 was used for the preparation of Example E3, wherein said holder (101) comprised a domed-shaped lid (102), a bottom locking (103), a non-magnetic wedge (104) and a non-magnetic matrix (141). The holder (101) had a length and a width (L21) of about 40 mm, a central thickness (L19) of about 15.15 mm, an edge thickness (L20) of about 14.80 mm. The curvature (L-R) of the domed-shaped lid (102) top surface was that of a circle having a radius (L-R) of about 137.5 mm. The bottom locking (103) of the holder (101) had a length and a width (L23) of about 32 mm, and a thickness (L22) of about 3 mm. The non-magnetic wedge (104) had a length and a width (L25) of about 30 mm and a thickness (L24) of about 5.8 mm. The holder (101) illustrated in FIG. 2 further comprises a non-magnetic matrix (141) comprising a void suitable for receiving the second magnetic-field-generating device (140), said non-magnetic matrix (141) being a square-shaped plate having a length (L25) of about 30 mm and a thickness (L4) of about 2 mm and comprising a disc-shaped void having a diameter (L3) of about 20 mm. The domed-shaped lid (102) and the bottom locking (103) of the holder (101) were made of polyphenylene sulfide (PPS). The non-magnetic wedge (104) and the non-magnetic matrix (141) were independently made of POM.

Examples 1-13 (E1-E13) and Comparative Examples 1-2 (C11-C2) were independently prepared with the magnetic assemblies (x00) encased within holders (x01) having the same external dimensions as the holder (101) described hereabove for Example 3 (E3). The thickness of the wedge (x04) was adapted to vary the distance (A1) and the non-magnetic matrix (x41) was adapted to fit to the second magnetic-field-generating device (x40).

The resulting OEL (x10) produced with the magnetic assembly (x00) illustrated in FIG. 1-12 are shown in FIG. 3A-13A at different viewing angles by tilting the substrate (x20) between −30° and +30° and the description of the optical impression of said OELs is provided in Table 2.

Figure 14:
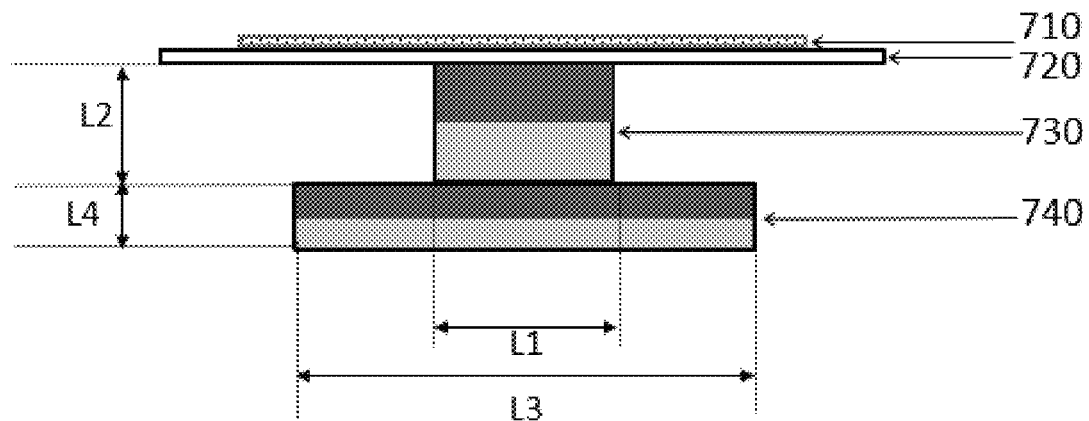
FIG. 14 schematically illustrates a comparative magnetic assembly according to CN 104442055 B and CN 204566894U for producing an optical effect layer (OEL) (710) on a substrate (720) surface, wherein the magnetic assembly comprises a) a first magnetic-field-generating device (730), in particular a disc-shaped magnetic-field-generating device, and b) a second magnetic-field-generating device (740), in particular a disc-shaped magnetic-field-generating device.
Figure 15:
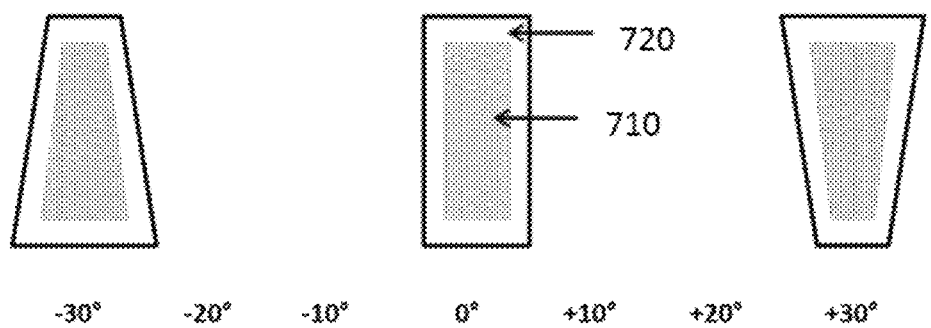
FIGS. 15 and 15A show pictures of OELs obtained by using the magnetic assembly illustrated in FIG. 14 as viewed at different viewing angles.

The resulting comparative OEL produced with the magnetic assembly illustrated in FIG. 14-16 are shown in FIG. 15A-17A at different viewing angles by tilting the substrate between −30° and +30° and the description of the optical impression of said OELs is provided in Table 3.

TABLE 2

Figure 5:
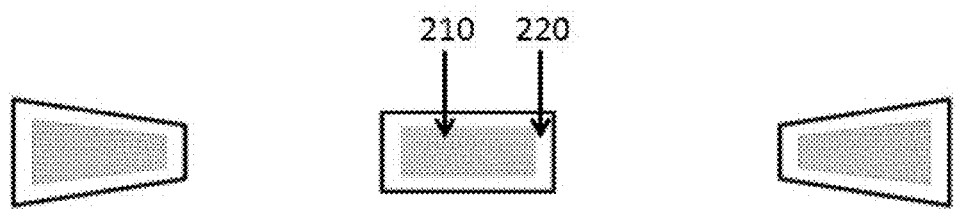
Figure 5A:
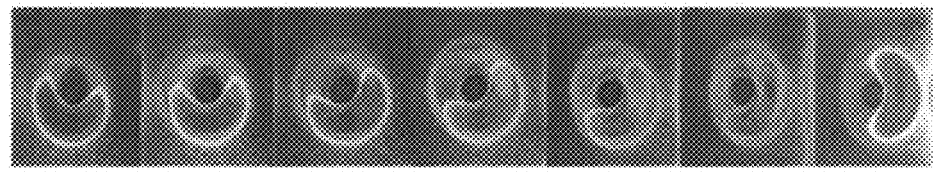
Figure 5B:
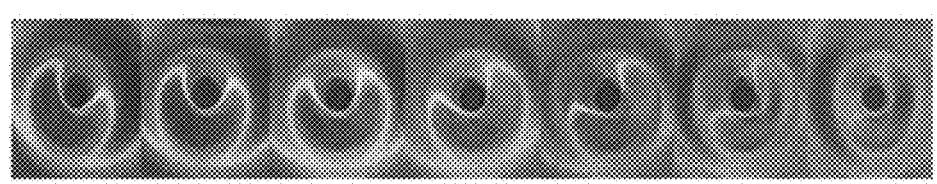
Figure 5C:
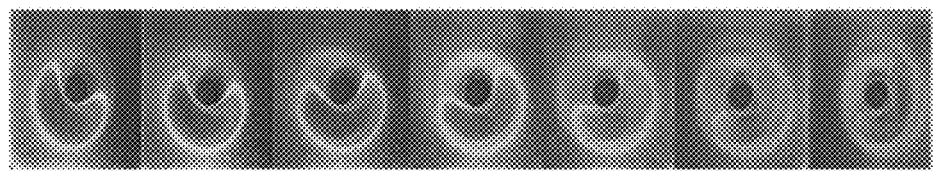
Figure 7:
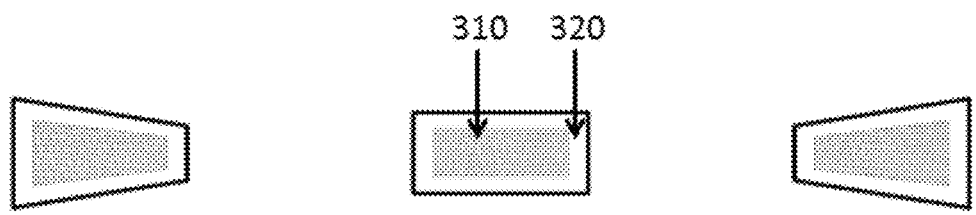
FIGS. 7 and 7A-7B show pictures of OELs obtained by using the magnetic assembly (300) illustrated in FIG. 6 as viewed at different viewing angles.
Figure 7A:
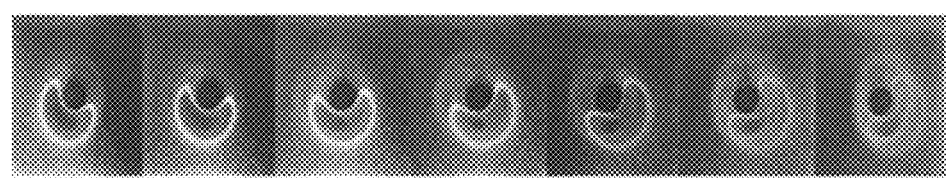
Figure 7B:

| FIG. | | x30<br>L1 × L2<br>[mm] | x40<br>L3 × L4<br>[mm] | x50<br>L5 × L6<br>[mm] | x60<br>L7 × L8<br>[mm] | x70<br>L9 × L10<br>[mm] | x80<br>L11 × L12<br>[mm] | A1<br>[mm] | A2<br>[mm] | Optical impression of the OEL by tilting the substrate (x20) between −30° and +30° |
|---|---|---|---|---|---|---|---|---|---|---|
| E1 | 1 | disc<br>5 × 3 | disc<br>20 × 2 | square<br>30 × 6 | | | | 0.35 | 6<br>(L6) | FIG. 3A: moving and rotating crescent moon effect around a circular dark area |
| E2 | 1 | disc<br>5 × 3 | disc<br>20 × 2 | square<br>30 × 1 | | | | 0 | 1<br>(L6) | FIG. 3B: moving and rotating crescent moon effect around a circular dark area |
| E3 | 1 | disc<br>5 × 3 | disc<br>20 × 2 | square<br>30 × 1 | | | | 0.35 | 1<br>(16) | FIG. 3C: moving and rotating crescent moon effect around a circular dark area |
| E4 | 1 | disc<br>5 × 3 | disc<br>20 × 2 | square<br>30 × 1 | | | | 1.35 | 1<br>(L6) | FIG. 3D: moving and rotating crescent moon effect around a circular dark area |
| E5 | 1 | square<br>5 × 2 | square<br>15 × 3 | square<br>30 × 1 | | | | 0 | 1<br>(L6) | FIG. 3E: moving and rotating crescent moon effect around a circular dark area |
| E6 | 4 | disc<br>5 × 3 | disc<br>20 × 2 | square<br>30 × 1 | square<br>30 × 1 | | | 0.35 | 2<br>(L6 + L8) | FIG. 5A: moving and rotating crescent moon effect around a circular dark area |
| E7 | 4 | disc<br>5 × 3 | disc<br>9 × 5 | disc<br>30 × 2 | square<br>30 × 1 | | | 0.35 | 3<br>(L6 + L8) | FIG. 5B: moving and rotating crescent moon effect around a circular dark area |
| E8 | 4 | disc<br>5 × 3 | disc<br>20 × 2 | square<br>30 × 1 | square<br>30 × 6 | | | 0.35 | 7<br>(L6 + L8) | FIG. 5C: moving and rotating crescent moon effect around a circular dark area |
| E9 | 6 | disc<br>5 × 3 | disc<br>20 × 2 | square<br>30 × 1 | square<br>30 × 1 | | | 0.35 | 2<br>(L6 + L8) | FIG. 7A: moving and rotating crescent moon effect around a circular dark area |
| E10 | 6 | dis<br>5 × 3 | disc<br>20 × 2 | square<br>30 × 1 | square<br>30 × 6 | | | 0.35 | 7<br>(L6 + L8) | FIG. 7B: moving and rotating crescent moon effect around a circular dark area |
| E11 | 8 | disc<br>5 × 3 | disc<br>20 × 2 | square<br>30 × 1 | | square<br>30 × 1 | | 0.35 | 1<br>(L6) | FIG. 9A: moving and rotating crescent moon effect around a circular dark area |
| E12 | 10 | disc<br>5 × 3 | disc<br>20 × 2 | square<br>30 × 1 | square<br>30 × 3 | square<br>30 × 1 | | 0.35 | 4<br>(L6 + L8) | FIG. 11A: moving and rotating crescent moon effect around a circular dark area |
| E13 | 12 | disc<br>5 × 2 | disc<br>20 × 2 | square<br>30 × 1 | square<br>30 × 1 | | square<br>38 × 0.9 | 0.90<br>(L12) | 2<br>(L6 + L8) | FIG. 13A: moving and rotating crescent moon effect around a circular dark area |

TABLE 3

Figure 15A:
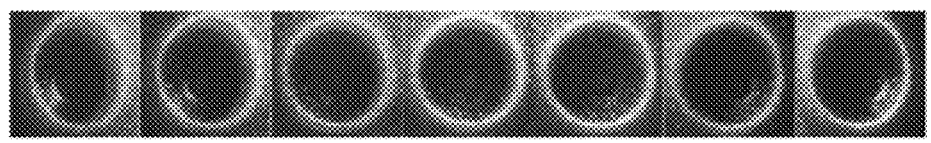

| FIG. | | x30<br>L1 × L2<br>[mm] | x40<br>L3 × L4<br>[mm] | x90<br>L13 × L14<br>L15 × L16<br>[mm] | x91<br>L17 × L18<br>[mm] | A1<br>[mm] | A2<br>[mm] | Optical impression of the OEL by tilting the substrate (x20) between −30° and +30° |
|---|---|---|---|---|---|---|---|---|
| C1 | 14 | Disc<br>5 × 3 | disc<br>20 × 2 | | | 0 | 0 | FIG. 15A: moving single ring-shaped effect |
| C2 | 16 | Disc<br>6 × 1 | disc<br>6 × 1 | disc<br>10 × 2<br>8 × 1 | disc<br>30 × 2 | 0 | 1 | FIG. 17A: moving double ring-shaped effect |

The invention claimed is:

1. A process for producing an optical effect layer on a substrate, said process comprising the steps of:
   i) applying on a substrate surface a radiation curable coating composition comprising non-spherical magnetic or magnetizable pigment particles, said radiation curable coating composition being in a first state, said first state being a liquid state;
   ii) exposing the radiation curable coating composition to a magnetic field of a magnetic assembly comprising:
      a) a first magnetic-field generating device having a North-South magnetic axis substantially perpendicular to the substrate surface and having length L1;
      b) a second magnetic-field generating device having a North-South magnetic axis substantially perpendicular to the substrate surface and having a length L3,
      c) a flat pole piece lacking any protrusions or projections extending outside a surface of said pole piece and having a length L5,
         wherein the first magnetic-field generating device and the second magnetic-field generating device have a same magnetic field direction,
         wherein the first magnetic-field generating device faces the substrate and is disposed on top of the pole piece,
         wherein the second magnetic-field generating device faces an environment and is disposed below the flat pole piece,
         wherein the length L1 of the first magnetic-field generating device is smaller than the length L3 of the second magnetic-field generating device,
         wherein the length L1 of the first magnetic-field generating device is smaller than the length L5 of the flat pole piece, and
         wherein the length L3 of the second magnetic-field generating device is smaller than the length L5 of the pole piece,
      so as to orient at least a part of the non-spherical magnetic or magnetizable pigment particles; and
   iii) at least partially curing the radiation curable coating composition of step ii) to a second state so as to fix the non-spherical magnetic or magnetizable pigment particles in adopted positions and orientations,
      wherein the optical effect layer provides an optical impression of a moon crescent moving and rotating upon tilting the substrate comprising the optical effect layer.

2. The process according to claim 1, wherein the magnetic assembly further comprises a non-magnetic plate.

3. The process according to claim 2, wherein the non-magnetic plate is made of polyoxymethylene.

4. The process according to claim 1, wherein the magnetic assembly further comprises a second flat pole piece having a length L9, wherein said second pole piece is disposed below the second magnetic-field generating device thus facing the environment.

5. The process according to claim 1, wherein the magnetic assembly further comprises a magnetized plate comprising one or more engravings and/or cut-outs representing one or more indicia, and wherein magnetized plate is disposed on top of the first magnetic-field generating device thus facing the substrate.

6. The process according to claim 5, wherein the magnetized plate is made of a composite material comprising a polymer and a permanent magnetic powder material.

7. The process according to claim 1, wherein the flat pole piece is made of iron.

8. The process according to claim 1, wherein the first magnetic-field generating device and the second first magnetic-field generating device are disc-shaped magnetic-field generating devices and length L1 and L3 correspond to a diameter of the first magnetic-field generating device and the second first magnetic-field generating device, respectively, or the first magnetic-field generating device and the second first magnetic-field generating device are square-shaped magnetic-field generating devices and length L1 and L3 correspond to a width of the first magnetic-field generating device and the second first magnetic-field generating device, respectively.

9. The process according to claim 1, wherein the non-spherical magnetic or magnetizable pigment particles are selected from the group consisting of magnetic thin-film interference pigments, magnetic cholesteric liquid crystal pigments and mixtures thereof.

10. The process according to claim 1, wherein step iii) is carried out partially simultaneously with the step ii).

11. The process according to claim 1, wherein the non-spherical magnetic or magnetizable particles are platelet-shaped pigment particles, and wherein said process further comprises a step of exposing the radiation curable coating composition to a dynamic magnetic field of a first magnetic-field-generating device so as to bi-axially orient at least a part of the platelet-shaped magnetic or magnetizable pigment particles, said step being carried out after step i) and before step ii).

12. An optical effect layer produced by the process recited in claim 1.

13. A security document or a decorative element or object comprising one or more optical effect layers recited in claim 12.

14. A magnetic assembly for producing an optical effect layer on a substrate, said optical effect layer providing an impression of a crescent moon-shaped element moving or rotating upon tilting the optical effect layer and comprising oriented non-spherical magnetic or magnetizable pigment particles in a cured radiation curable coating composition, wherein said magnetic assembly comprises:

a) a first magnetic-field generating device having a North-South magnetic axis substantially perpendicular to the substrate surface and having a length L1;

b) a second magnetic-field generating device having a North-South magnetic axis substantially perpendicular to the substrate surface and having a length L3, c) a flat pole piece lacking any protrusions or projections extending outside a surface of said pole piece and having a length L5, wherein the first magnetic-field generating device and the second magnetic-field generating device have a same magnetic field direction, wherein the first magnetic-field generating device faces the substrate and is disposed on top of the pole piece, wherein the second magnetic-field generating device faces an environment and is disposed below the pole piece, wherein the length 1 of the first magnetic-field generating device is smaller than the length L3 of the second magnetic-field generating device, wherein the length L1 of the first magnetic-field generating device is smaller than the length L5 of the pole piece, and wherein the length L3 of the second magnetic-field generating device is smaller than the length L5 of the pole piece.

15. The magnetic assembly according to claim 14 further comprising a non-magnetic plate and/or further comprising a second flat pole piece having a length L9, wherein said second pole piece is disposed below the second magnetic-field generating device thus facing the environment and wherein the length L1 of the first magnetic-field generating device is smaller than the length L9 of said second pole piece and the length L3 of the second magnetic-field generating device is smaller than the length L9 of said second pole piece, and/or further comprising a magnetized plate comprising one or more engravings and/or cut-outs representing one or more indicia, and wherein magnetized plate is disposed on top of the first magnetic-field generating device thus facing the substrate.

16. The magnetic assembly according to claim 15, wherein said magnetized plate is made of a composite material comprising a polymer and a permanent magnetic powder material.

17. The magnetic assembly according to claim 14, wherein the magnetic assembly is disposed in a holder mounted on a transferring device.

18. The magnetic assembly according to claim 17, wherein the transferring device is a rotating magnetic cylinder.

19. A printing apparatus comprising a rotating magnetic cylinder comprising at least one of the magnetic assemblies recited in claim 14 or a flatbed printing unit comprising at least one of the magnetic assemblies recited in claim 14.

* * * * *